March 3, 1970 R. W. HELLING ET AL 3,499,072
METHOD FOR FORMING CYLINDRICAL SLEEVES FROM
THERMOPLASTIC RESIN SHEETS
Filed May 3, 1967 2 Sheets-Sheet 1

*INVENTORS*
ROBERT W. HELLING
HERBERT R. ERICKSON
BY *Van Valkenburgh & Lowe*

ATTORNEY

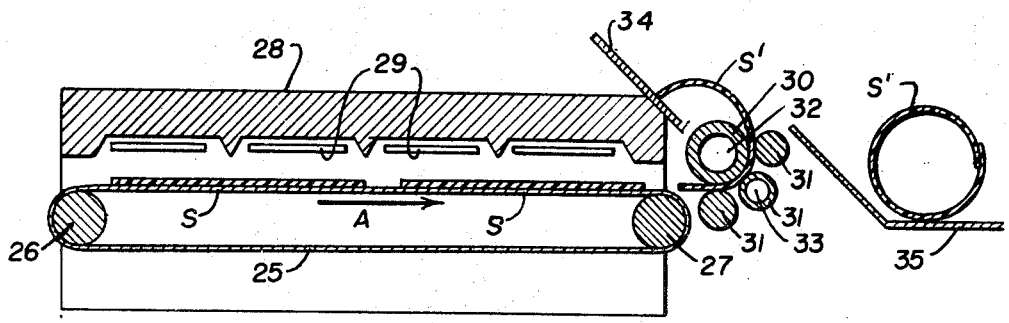
Fig. 4
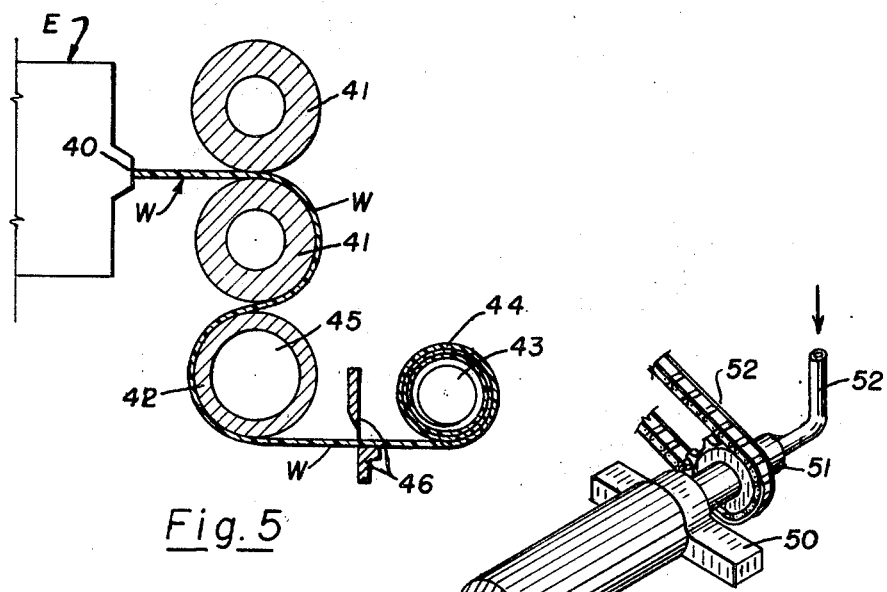
Fig. 5
Fig. 6
INVENTORS
ROBERT W. HELLING
HERBERT R. ERICKSON
BY
ATTORNEY United States Patent Office 3,499,072
Patented Mar. 3, 1970

3,499,072
METHOD FOR FORMING CYLINDRICAL SLEEVES FROM THERMOPLASTIC RESIN SHEETS
Robert W. Helling, Greeley, and Herbert R. Erickson, Denver, Colo., assignors to Lundvall and Associates, Greeley, Colo., a partnership
Filed May 3, 1967, Ser. No. 635,743
Int. Cl. B29d 23/12; B29c 17/14
U.S. Cl. 264—151                           2 Claims

ABSTRACT OF THE DISCLOSURE

A method for curling a rectangular sheet of thermoplastic synthetic resin to form a cylindrical sleeve which may be wrapped about a pipe or the like. The plastic sheet is heated to a temperature above the set temperature of the material, curled as upon a mandrel and held in the curled position until it is cooled to a temperature below the set temperature to form the sleeve. As a continuous operation, a web of plastic may be heated above the set temperature, rolled upon a mandrel, cooled below the set temperature and sleeves cut from this rolled web.

---

This invention relates to methods for forming cylindrical split sleeves from sheets of thermoplastic types of synthetic resins. The term, a cylindrical split sleeve, or sleeve, as herein used refers to a rectangular sheet of synthetic resin curled to a cylindrical form with the longitudinal edges of the sheet normally overlapping each other so that they may be cemented or welded in place, as about a pipe, as a longitudinal seam and thus convert the sleeve into a cylindrical tube.

A primary object of the invention is to provide a novel and improved method for forming a cylindrical sleeve of thermoplastic resin which is especially adapted to be encased about a pipe or the like so that the longitudinal edges of the sleeve may then be welded together to ensheath the pipe within the resulting tube.

Conventional methods of manufacturing sheets of thermoplastic synthetic resin materials, hereinafter referred to as "plastic sheets," are directed towards the production of flat unwarped sheets of standardized sizes which will lie flatly upon a work bench or in a stack. When furnished as rolls of continuous web material, it is desirable that the sheet unroll to a flat form for its ultimate use. Such plastic sheets are used for many purposes, such as for surface coverings, laminations and also as base stock for thermoforming drawing operations to produce three dimensional sheet products. Such plastic sheets may be provided with a thickness varying from a few mils to as much as or more than one-quarter inch and within this range, sheets having a thickness varying from 30 mils to 60 mils, more or less, are especially useful because they are sufficiently flexible as to be wrapped about a cylindrically curved surface such as a pipe, and yet, are sufficiently rigid as to resist denting and wrinkling under ordinary circumstances. Very thin sheets, such as a 3-mil sheet, will easily wrinkle and crease, while thicker sheets, such as a one-quarter-inch sheet are too stiff to cement or work with, wil not flex except about very large radius curves.

The intermediate range of plastic sheets, 30 to 60 mil thickness, more or less, have been found to be especially useful as a protective covering for insulated pipes, where the surrounding environment is unfavorable to the insulation because of excess humidity, deleterious gases in the atmosphere or for many other reasons. In using such plastic sheets as a protective covering for a pipe, it has been found that the best mode of enveloping a reach of pipe is to wrap a single rectangular sheet of the plastic of appropriate size about the pipe and to then weld the single longitudinal seam formed by lapping opposite edges of the sheet with an appropriate adhesive or solvent solution. However, considerable difficulty was encountered in such a wrapping operation, especially where it was desired to wrap a comparatively thick sheet about a comparatively small diameter pipe. In the first place, although the small section of plastic sheet would easily wrap, when a substantial reach of plastic, such as a four-foot length, was wrapped about a pipe as a single operation, a considerable force was required to hold the sheet snugly upon the pipe. Also, the lapping portions of the sheet had to be held in position until the welding operation was completed. When using a solvent or adhesive, this would ordinarily require several hours, a time interval which rendered the entire operation impractical.

The present invention was conceived and developed with such considerations in view, and comprises, in essence, a method of curling a rectangular sheet of plastic to form an overlapping cylindrical sleeve, properly sized to snugly fit a standard insulated pipe with the opposing edges overlapping at the longitudinal seam. The advantages of the cylindrical sleeve are manifest; it can be snapped into position without any substantial effort, it will remain in position with the edges overlapped without the need of holding devices, and the welding of the seam does not present any complications. Also, the time loss involved holding the overlapping edges together while waiting for the weld to set is usually eliminated.

Accordingly, another object of the invention is to provide, in a novel and improved method for forming a cylindrical sleeve of plastic sheet material, a simple, low-cost curling operation to shape and set the flat plastic sheet to the desired cylindrical form.

Another object of the invention is to provide, in a novel and improved method for forming a cylindrical sleeve of plastic sheet material by a curling operation, a sequence of heating and cooling operations which, in conjunction with the curling operations, impose a permanent set to the finished plastic sheet sleeve.

Another object of the invention is to provide, in a novel and improved method for forming a cylindrical sleeve of plastic sheet material by curling operations, the use of moderate temperatures, less than the ordinary working temperatures of the material, which can be applied to a plastic sheet without any danger of softening warping, deteriorating or otherwise injuring or altering the plastic sheet or modifying its surface texture in any manner.

Another object of the invention is to provide a novel and improved method of curling plastic sheets to form cylindrical sleeves which may be used with individual blanks of sheet stock of plastic, or may be used with equal effectiveness with a continuous web of sheet stock and with sheet stock as it is being formed in an extruding apparatus.

Other objects of the invention are to provide a novel and improved method of curling plastic sheets to form cylindrical sleeves which is simple, quick, inexpensive and provides for a minimum interruption to other operations, as when the sleeves are being manufactured in a continuous manner.

With the foregoing and other objects in view, as will hereinafter appear, our invention comprises certain operations, steps and sequences as hereinafter described, defined in the appended claims and exemplified in the accompanying drawing, in which:

FIGURE 4 is a diagrammatic sectional view of another type of apparatus adapted to curl blanks as shown at FIG. 1 to form overlapping sleeves but which may also be used to curl a continuous web of material as it is fed through the machine, as hereinafter described.

FIGURE 5 is a diagrammatic sectional view of certain components of a sheet extruding machine which is modified to curl selected reaches of a continuous web of plastic sheet material as it is formed in the extruding machine.

FIGURE 6 is a fragmentary, somewhat diagrammatic, isometric view of a roll of a type which may be used in facilitating curling operations, according to the invention.

Figure 1:
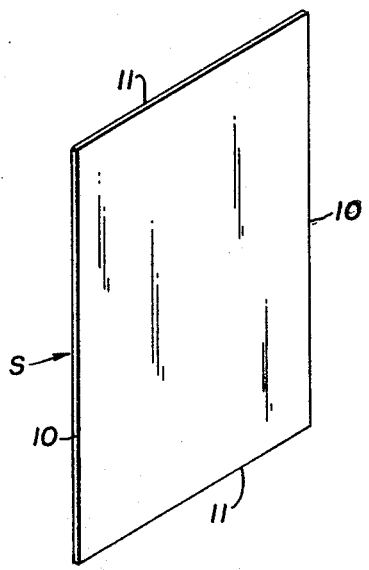
FIGURE 1 is an isometric view of a flat sheet of plastic material which constitutes a blank for forming a cylindrical sleeve.

The desirable types of synthetic resin sheets which may be used as cylindrical sleeves for covering pipe or the like, and which may be curled according to the present invention, include high-impact polystyrene and acrylonitrile butadiene styrene, the latter known to the trade and hereinafter referred to as ABS. Both types of plastic sheets are strong, tough, impermeable and effectively resist growths, many corrosive chemicals and deterioration. They are also quite flexible, and sheets in the desired thickness range of approximately 30 to 60 mils can be wrapped about pipes as small as two inches in diameter without cracking. Another desirable feature of polystyrene and ABS resides in the fact that they can be effectively cold welded with certain common solvents, such as methyl-ethyl-ketone.

These two resins are representative of a group of other thermoplastic resins having similar physical properties and may be considered chaarcteristic of a group of resins which at ordinary temperatures are dense, tough solids, but at elevated temperatures, usually within the range of 350 to 425 degrees F., are viscous fluids and suitable for forming into sheet material by extrusion operations. The sheets are strong, tough, impermeable and will not support organic growths. They will also resist many corrosive chemicals. Further, the sheets are sufficiently flexible to be wrapped about pipes and the like, and the seams can be cold welded by solvents or adhesives.

Insofar as their temperature characteristics are concerned, resins of this selected group do not exhibit any significant change of properties until they are heated to a critical temperature range where there is a rapid drop of strength. This temperature range will be herein referred to as the "sag temperature" of the material. At such temperature, or temperature range, pressure welding of the material can occur, and at further small increases of temperature, the material is suitable for thermoforming, and at yet higher temperatures, for injection molding.

Considerable technology has been developed in the working of plastic sheets of the group represented by polystyrne and ABS at temperatures above the previously defined sag temperature, or temperature range, to perfect operations such as forming and vacuum and pressure drawing. In contrast, in cold working, it has been assumed that while the sheets may be flexed and curled to form cylindrical or conical surfaces, they may be worked only as flat sheets and cannot be permanently warped out of their basic flat planar form. As heretofore mentioned, in protectively wrapping an insulated pipe with plastic sheets in the 30 to 60 mil thickness range, the resilience of the sheets rendered the operation quite difficult and the desirability of providing sheets curled to cylindrical sleeves became manifest.

The curling of flat plastic sheets at ambient temperature was out of the question because the material would not acquire a permanent set, and if deflected significantly beyond the elastic limit, it would crack. The curling of the sheets at the sag temperature of the materials where they commenced to lose strength did not appear practical because of the difficulty of handling the sheets, and also, because of the tendency for the sheets to warp with changes in their physical properties.

It was discovered, however, that an intermediate temperature range existed where the resin structure of the plastic sheets apparently became plastic to a degree sufficient for the sheets to take a permanent set if heated to such temperatures, curled and then cooled while in the curled condition. This set temperature, suitable for working both polystyrene and ABS was well below the sag temperature and was within the range of 175 to 195° F. for both polystyrene and ABS. If less than approximately 175° F., the setting action would not occur, and if greater than approximately 195° F., cooling operations became difficult, and there was a tendency for the plastic sheets to warp or distort.

Figure 2:
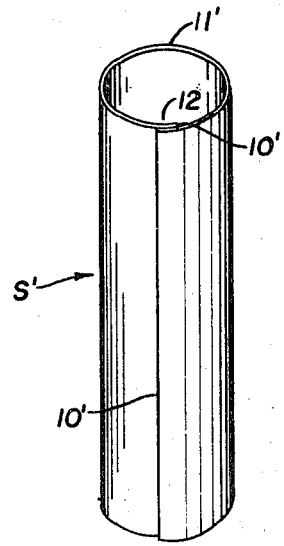
FIGURE 2 is an isometric view of the blank shown at FIG. 1 after it has been curled and formed into an overlapping cylindrical sleeve.

Referring more particularly to the drawing, a flat rectangular plastic sheet S, FIG. 1, is formed into a cylindrical sleeve S', FIG. 2. Longitudinal opposing edges 10 of the sheet form the lapping seam 12 of the sleeve while transverse opposing edges 11 of the sheet form the ends 11' of the sleeve. The length of the sheet S and sleeve S' is ordinarily determined by the width of suitable regular sheet stock, such as three, four or five feet. The width of the sheet S is established as the circumference of the pipe whereon the sleeve is to be mounted plus a suitable overlap to form the seam 12. It follows that the sheets used for the sleeve S', having a thickness ranging from 30 to 60 mils, are comparatively thin and that if a two-inch diameter pipe is the normal, minimum size pipe, it is apparent that this thickness will be less than 1 percent of the width of the sheet, even with this narrow size sheet.

Figure 3:
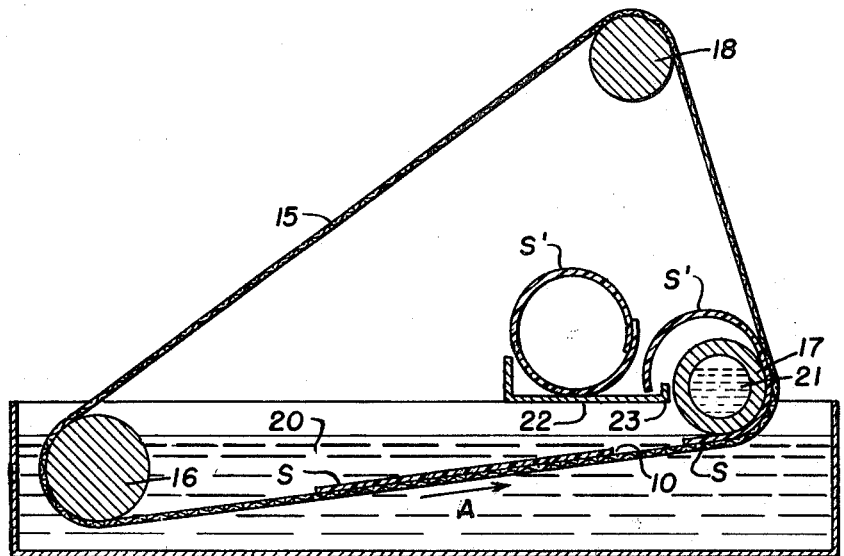
FIGURE 3 is a diagrammatic sectional view of an apparatus adapted to curl blanks as shown at FIG. 1 to form overlapping sleeves according to the principles of the invention.

In order to convert the flat sheet to the cylindrical sleeve, according to the present invention, it is necessary to heat the sheet to the selected setting temperature between 175 and 195° F., and then curl and simultaneously cool the sheet. Such an operation may be accomplished with apparatus diagrammatically illustrated at FIG. 3. A continuous web 15 of a reticulated material such as screen, is extended about three rolls, a rear base roll 16, a front curl roll 17 and an upper clearance roll 18. These rolls are mounted in a triangular arrangement upon a framework, not shown, and above a flat tub 19 which contains hot water 20. The rear base roll 16 is substantially submerged in the water at one end of the tub and the curl roll 17 is positioned substantially at the water surface at the other end of the tub to submerge the bottom reach of web 15 between these rolls.

Operation of the apparatus, by driving the rolls to move the web in the direction of the indicated arrow A, is effected by placing a sheet S upon the bottom reach of the web with the longitudinal edges 10 in leading and trailing positions. The movement of the web by rotation of the rolls moves the sheet S through the bath of hot wtaer 20 which is heated to the selected set temperature, of between 175 and 195° F., as by a means not shown. Further movement of the web moves the heated sheet S about the curl roll 17 where it is held in a cylindrical position upon the roll by the web extending from a bottom reach to an upward reach to the upper roll 18.

The curl roll 17 is also adapted to cool the sheet. A hollow passageway 21 extends through the roll and conduits associated with the roll, as illustrated at FIG. 6, provide a flow of cold water through the roll passageway. This cooling action, along with exposure to the air at the screen side causes the temperature of the sheet plastic to drop below the curling temperature and to acquire a permanent set in its cylindrical form. Further movement of the web moves the curled sleeve S' onto a platform 22 back of the curl roll and above the tub, this platform 22 including a suitable lip 23 adjacent to the roll which aids in pulling the sleeve off from the roll, as in the manner illustrated. Once upon the platform, the finished sleeve S' may be removed and additional sheets S may be placed upon the bottom reach of the web within the water as the movement through the apparatus progresses.

A modified form of the apparatus for curling plastic sheets S is illustrated at FIG. 4. A conveyor belt 25 is horizontally mounted upon spaced rolls 26 and 27. This conveyor belt extends through an oven 28 wherein the upper surface of the belt 25 is heated by heaters 29, preferably electrical heaters or of any suitable type which may be easily controlled to raise the temperature of a sheet S passing through the oven, to the selected set temperature. A set of rolls is located at the exit of this oven, including an upper curl roll 30 and an array of guide rolls 31 about a sector of the curl roll 30. In operation, a sheet S moves between the curl roll and the guide rolls to be wrapped about the roll 30. The curl roll 30, and if necessary, one or more of the guide rolls 31 are formed with tubular passageways 32 and 33, respectively, to permit connections to be made with piping so that cold water may flow through the rolls and cool the curled plastic sheet S to a temperature below the setting temperature so that it forms a cylindrical sleeve S'. This sleeve is then deposited upon any suitable platform 34 and moves subsequently to a disposal tray 35.

The apparatus diagrammatically illustrated at FIG. 5 represents a conventional plastics extruding machine E which forms a plastic web W. This web W is extruded from the dies 40 at a temperature of as much as 400 degrees F. It then moves between upper and lower sizing and polishing rolls 41 and thence about a cooling roll 42. The polishing rolls 41 and cooling roll 42 are all cooled to an extent sufficient to ordinarily reduce the final temperature of the web to approximately 125 degrees F. This web, in a conventional operation, then passes through other rolls and upon flat plates where it is formed as flat planar sheet. In a conventional operation, the web moves through the sizing and polishing rolls about the cooling rolls and thence through other rolls and plates. This movement is under tension to keep the comparatively thin web from sagging and buckling when it is hot.

In practice of the invention, however, the web W moves about the cooling roll 42, which is modified in operation to prevent the web from dropping below the curling temperature range of from 175 to 195 degrees F. The web W is then extended to a mandrel 43 whereon it is wrapped, as into a roll 44.

The cooling roll 42 is provided with a suitable passageway 45 which is connected with conduits to provide a flow of water therethrough. It is to be noted that the web, in its passage about the temperature regulating roll is cooled, or heated if necessary, to the selected curl temperature so that the web has acquired the selected curling temperature before it is wrapped upon the mandrel 43. It is important, in this operation, that the web temperature does not exceed the upper limit of the permissible setting temperatures, approximately 195 degrees F. so that the wraps upon the mandrel will not tend to stick together as if they were welded. In the present process it is necessary to hold the hot thin web under tension as it moves through the sizing and polishing rolls and about the roll 42 which serves as a temperature regulating roll; also, it is necessary that this comparatively thin, hot web be under tension to prevent buckling and sagging, the drawing at FIG. 5 showing the web being stretched between the roll 42 and the mandrel 43 without sagging or buckling.

The mandrel 43 is of any suitable diameter, and it was found that a substantial number of wraps of the web W may be taken upon the mandrel before the web roll 44 formed thereby must be severed from the web as by a shear 46 and removed from the machine. In this arrangement, it is to be noted that the curling and cooling action is completed while the web is on the roll 44. Subsequently, a sequence of sleeves S' may be cut from the roll.

By cutting a sequence of sleeves S' from a roll 44, it is to be recognized that the curvature of each sleeve will vary slightly. However, this presented no difficulty in pipe wrapping operations because the comparatively thin plastic sleeves were quite flexible and variations in the diameter of the sleeve of as much as one inch, would make no difference in a sleeve wrapped about a six or eight inch pipe.

FIG. 6 illustrates, somewhat diagrammatically, a construction of a roll R such as may be used for a curling roll 21 or 32, or a temperature regulating roll 42. This roll R is a tubular unit which is mounted upon suitable bearings 50 with tubular shaft portions 51 of the roll extending through each bearing. A suitable drive, indicated at 52 as a chain about a sprocket, is adapted to rotate the roll, and maintain tension. If necessary, a proper amount of water is passed through this roll by a supply pipe 52 extending into the end of one shaft portion 51 to maintain a selected temperature of the roll, and the water flows from an exhaust pipe 53 in the end of the other shaft portion 51, at the opposite side of the roll. The supply and exhaust pipes extending into the ends of the tubular shaft portions are provided with suitable glands, not shown, to prevent leakage when the shafts rotate about the pipes.

We have now described our invention in considerable detail. However, it is obvious that others can provide other operations and sequences which are within the spirit and scope of the invention.

We claim:

1. A method of formnig a sequence of cylindrical split sleeves for pipes of varying diameter from a hot web of thermoplastic synthetic resin, wherein the web is thin compared to its width, having a thickness substantially less than one percent of the width, and wherein the web has the general characteristics of polystyrene and is characterized by having a set temperature, in the approximate range of 175 to 195° F. for polystyrene, including the steps of:

(a) directing the web under tension about a temperature regulating roll adapted to change the temperature of the web to a temperature within the aforesaid set temperature range as it leaves the roll;

(b) wrapping the web upon a rotating mandrel to curl the web about and upon the mandrel and into a coil of a substantial number of layers of increasing diameter;

(c) permitting the wrapped web to cool from a set temperature to a temperature below the set temperature and to a temperature approaching the ambient temperature whereby the web remains in a curled state; and (d) cutting the web transversely in selected lengths to form a sequence of cylindrical sleeves, each length normally constituting more than a single layer of the coil, and each length providing a sleeve having a circumference sized to fit, with overlapping edges about a pipe having a circumference less than the circumference of said sleeve.

2. In the method defined in claim 1, wherein:

said web is continuously formed by extruding the same from an extruding apparatus at a temperature substantially above the set temperature;

said web is passed through sizing rolls to size the thickness of the web and at the same time effect a partial reduction of temperature normally greater than the aforesaid set temperature; and said web is thereafter passed about the aforesaid temperature regulating roll.

References Cited

UNITED STATES PATENTS

| | | | |
|---|---|---|---|
| 607,415 | 7/1898 | Robinson | 264—320 XR |
| 2,545,868 | 3/1951 | Bailey | 18—12 |

(Other references on following page)

UNITED STATES PATENTS

| | | | |
|---|---|---|---|
| 2,865,047 | 12/1958 | Mason | 264—297 |
| 2,964,065 | 12/1960 | Haroldson | 264—159 XR |
| 3,414,649 | 12/1968 | Heeoe | 264—297 |
| 2,035,914 | 3/1936 | Olsen | 18—51 |
| 2,398,876 | 4/1946 | Bailey | 18—19 |
| 2,435,561 | 2/1948 | Spinner | 18—48 |
| 2,528,528 | 11/1950 | Lyon | 264—151 |
| 2,676,360 | 4/1954 | Emmer | 264—339 |
| 3,280,240 | 9/1966 | Bardy | 264—242 |

ROBERT F. WHITE, Primary Examiner

R. R. KUCIA, Assistant Examiner

U.S. Cl. X.R.

264—210, 281, 339